March 5, 1963     D. A. JOHNSTON     3,079,896
ROTATING FLUID CYLINDERS
Filed Oct. 12, 1960     2 Sheets-Sheet 1
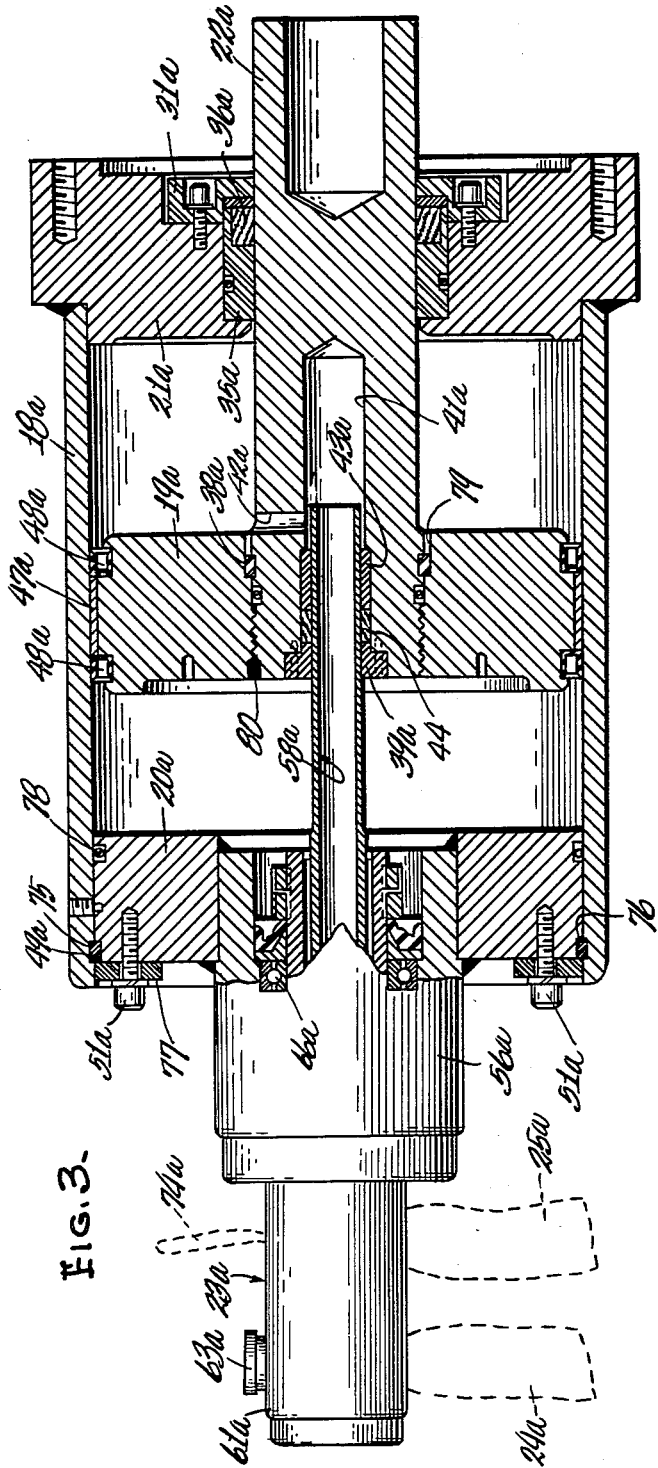
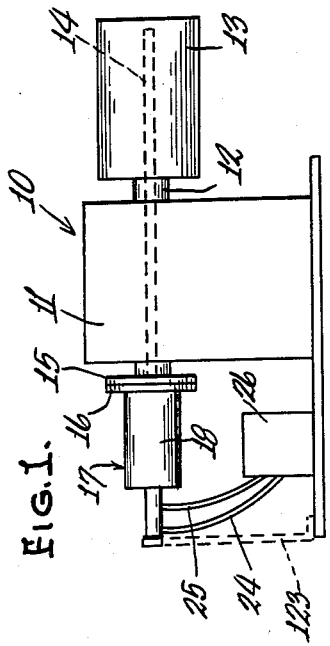
INVENTOR.
DWIGHT A. JOHNSTON
BY
ATTORNEY

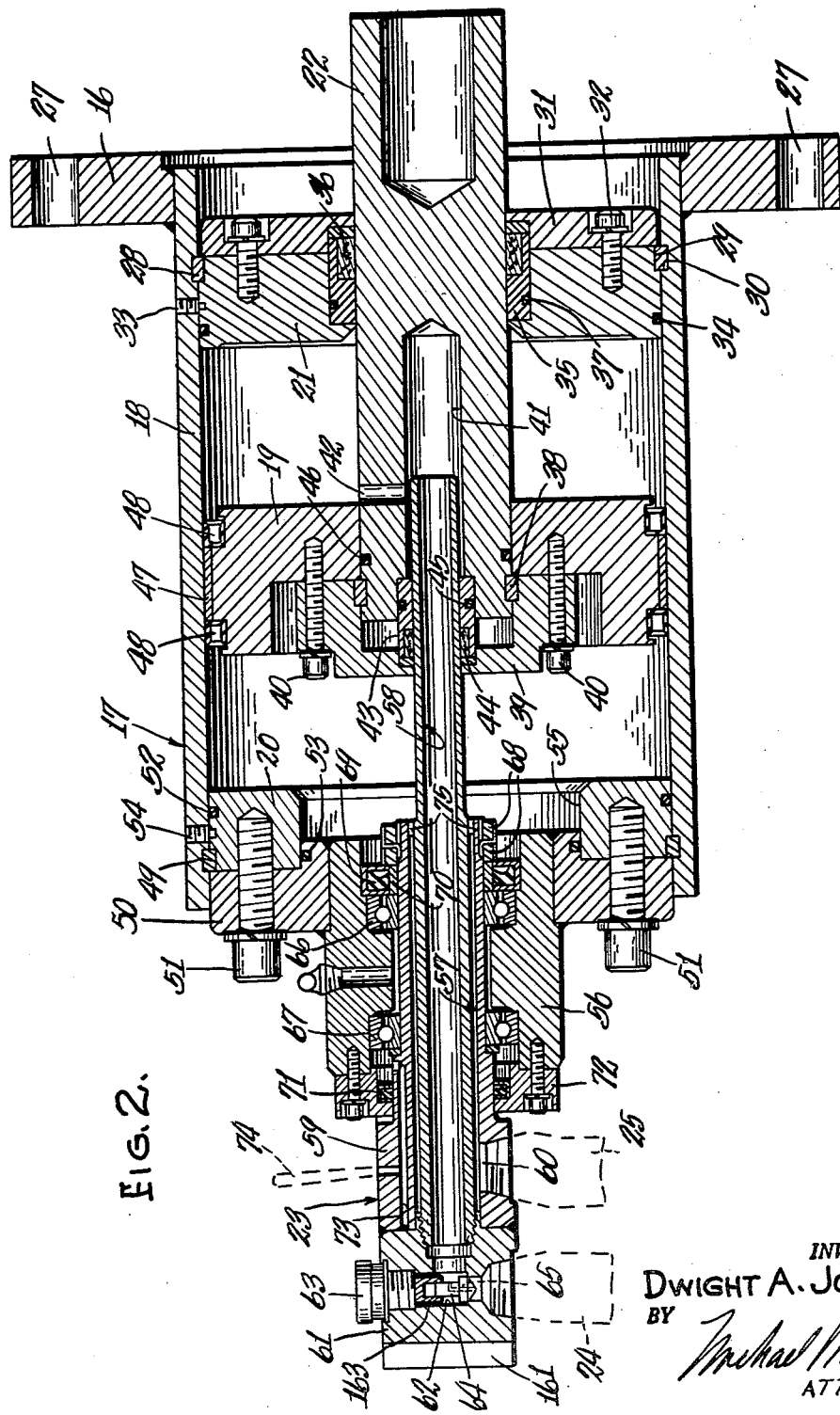
Fig. 2.
INVENTOR.
DWIGHT A. JOHNSTON
BY
ATTORNEY

United States Patent Office 3,079,896
Patented Mar. 5, 1963

3,079,896
ROTATING FLUID CYLINDERS
Dwight A. Johnston, Youngstown, Ohio, assignor to International Basic Economy Corporation, New York, N.Y., a corporation of New York
Filed Oct. 12, 1960, Ser. No. 62,182
9 Claims. (Cl. 121—38)

The present invention relates to fluid cylinders, more particularly to fluid cylinders of the rotating type, and the principal object of the invention is to provide new and improved cylinders of such character.

Rotating cylinders are widely used in industry wherever a rotating member must be reciprocated in the direction of its rotational axis. While these rotating cylinders are considerably more expensive than ordinary cylinders, their use is nevertheless practical since alternative constructions would require the use of a conventional cylinder connected to the rotating member through a thrust bearing. Because of the very large forces and speeds involved, a suitable thrust bearing would require considerable space and would be prohibitive in cost. Therefore, the use of rotating cylinders is practical despite their relatively high cost and maintenance requirements.

In prior art rotating fluid cylinder of the double acting type; that is, of the type wherein the piston is urged in both directions by fluid under pressure, a passage is formed in the wall of the cylinder barrel for conducting fluid toward and away from one side of the piston. Since the passage weakens the cylinder barrel wall, the latter is frequently made thicker than would otherwise be necessary merely to insure sufficient strength at the place where the passage is formed. This unduly increases both the weight and cost of the assembly. Furthermore, since the cylinder barrel is relatively thin, great difficulty is experienced in drilling the passage aforesaid since the drill has a tendency to drift off its desired path and run out through either the interior or exterior wall of the cylinder thus completely ruining the latter. The longer the cylinder barrel, of course, the greater is the difficulty of properly drilling the passage aforesaid.

The present invention completely eliminates the problem of prior art, rotating cylinder manufacture by means of a novel structur which obviates the necessity of forming a passage in the cylinder barrel wall. Other advantages of the present invention will readily become apparent from a study of the following description and the drawings appended hereto.

In the drawings accompanying this specification and forming a part of this application there is shown, for purpose of illustration, embodiments which the invention may assume, and in these drawings:

FIGURE 1 is a generally diagrammatic elevational view illustrating a common application of a rotating fluid cylinder, FIGURE 2 is an enlarged, longitudinal sectional view through a preferred embodiment of a fluid cylinder structure of the present invention, and FIGURE 3 is a fragmentary view similar to FIGURE 2 but of another embodiment of the invention.

With reference to FIGURE 1, there is shown a device 10 of the type adapted to wind strip metal or like material to coil form. Such a device is also frequently employed to support a coil of material for unwinding. In any event, the device illustrated comprises a stand 11 which rotatably supports an arbor 12. Secured to one end of arbor 12 is an expansible-contractable mandrel 13 of any well-known type. Drive means for rotating arbor 12 or a braking device for limiting its rotation may be disposed either within the stand 11 or closely adjacent thereto.

Extending longitudinally of the hollow interior of arbor 12 is an actuating rod 14 whose reciprocation effects expansion and contraction of the mandrel 13. The left (in the position of parts shown) end of arbor 12 may be provided with a radially extending flange 15 to which a matching flange 16 of a rotating fluid cylinder 17 is secured. Cylinder 17, see also FIGURE 2, comprises a cylinder barrel 18 in which a piston 19 is reciprocable between axially spaced heads 20, 21. Secured to piston 19 and projecting through the right cylinder head 21 is a piston rod 22 which is adapted to be secured to the actuating rod 14 in any suitable manner whereby reciprocation of the piston 19 effects reciprocation of the actuating rod.

Projecting from the left end of the cylinder 17 is a stationary, fluid distributing shaft 23 to which are connected a pair of fluid transmission lines 24, 25. Such lines are in communication with a suitable source of fluid under pressure such as a hydraulic pump 26. Although not shown, a suitable valve will direct flow of pressurized fluid through line 24 to reciprocate rod 14 in one direction or through line 25 to reciprocate rod 14 in the opposite direction. As will later more fully appear, the entire cylinder structure 17, including the cylinder barrel, piston, piston rod and cylinder barrel heads, rotate with the arbor 12. The only non-rotating part of the cylinder is the fluid distributing shaft 23, which may be connected to a bar 123 projecting upwardly from the base of the stand 11, and certain parts affixed thereto.

Referring now to FIGURE 2, the cylinder barrel 18 is shown formed of a relatively thin-walled tube to the right end of which is welded the flange 16. The latter is apertured at 27 to pass fastening bolts (not shown) by means of which the cylinder barrel may be secured to the previously mentioned flange 15 of the arbor 12.

Disposed adjacent the right end of cylinder barrel 18 is the cylinder head 21.

Any suitable means may be employed to fixedly retain the head within the cylinder barrel and in the present embodiment, the interior of the barrel has an annular groove in which is seated a ring member 28. Although not shown, such ring member will preferably be formed of a plurality of arcuate segments to facilitate assembly and disassembly. The right end of the head has a reduced diameter portion 29 which closely fits within the ring member 28 to retain it in its barrel groove and a shoulder 30 which abuts that side of the ring member facing inwardly of the cylinder barrel. A retainer member 31 is secured to the right side of head 21 by means of screws 32 and abuts the outwardly facing side of the ring member 28 to thus clamp the head to the ring member. A set screw 33 may be threaded into the cylinder barrel wall with its reduced diameter end seated in a recess in the head to positively lock the latter against rotation relative to the cylinder barrel. An O sealing ring 34 is seated in an annular groove in the head and bears against the interior of the cylinder barrel to prevent fluid leakage therebetween.

As earlier mentioned, head 21 is centrally apertured to pass the piston rod 22. Any suitable packing arrangement may be employed to prevent fluid leakage between the head 21 and the piston rod 22 and as herein disclosed, the head is recessed to receive a sleeve 35 carrying packing 36 which effects a seal therebetween. The retainer 31 holds the sleeve within the head recess and an O sealing ring 37 effects a fluid-tight seal between the sleeve and the head.

As previously disclosed, the piston 19 is secured to the left (in the position of parts shown) end of the piston rod 22. While any suitable arrangement could be employed to secure the piston and the rod together, it is preferable in this embodiment to removably effect such securement by clamping the piston against a ring member 38, positioned in a groove in the piston rod, by means of a cup-shaped retainer member 39 which is secured to the piston by capscrews 40. Ring member 38 will preferably be similar to 28 in that it will be formed of a plurality of segments to facilitate its assembly with the piston rod.

For a purpose to appear, an opening 41 extends axially of the piston rod from its left end and is intersected by a transverse passage 42 disposed at the right end of the piston. Such passage establishes communication between the opening 41 and the cylinder barrel space intermediate the head 21 and the piston 19. Also for a purpose to appear, clamp member 39 retains in the end of piston rod 22 a sleeve member 43 carrying packing 44. O sealing rings 45, 46 respectively effect a fluid tight seal between sleeve member 43 and the piston rod 22 and between the latter and the piston 19.

Returning again to the piston, its cylinder barrel engaging surface is preferably provided with a soft metal overlay or the like 47 which insures its smooth sliding interengagement with the cylinder barrel. A fluid-tight seal between the cylinder barrel and the piston is provided by oppositely facing, U-shaped sealing rings 48 disposed in respective grooves formed at respective piston ends.

Turning now to the left end of cylinder barrel 18, the latter is closed by the previously mentioned head 20 which is adapted to be secured in position in a manner similar to head 21 by being clamped against a ring member 49 (similar to ring member 28) by an annular member 50 secured to the head by capscrews 51. O sealing rings 52, 53 respectively effect a fluid-tight seal between the cylinder barrel 18 and the head 20 and between the latter and annular member 50. A set screw 54 may be carried by the cylinder barrel to prevent rotation between the latter and the head 20. For reasons to appear, head 20 is centrally apertured at 55 and such aperture is of a size to pass the retainer 39 carried by the piston 19.

In the present embodiment, a tubular bearing housing projects from the annular member 50 outwardly of the cylinder barrel. While such housing could be formed integrally with the member 50, it is preferred to form the housing separately therefrom and to weld the parts together to provide an integral assembly.

Turning for the moment away from the housing 56 and to the previously mentioned fluid distributing shaft 23, the latter comprises a pair of concentric tubular members 57, 58 extending through the tubular bearing housing. The outermost tubular member 57 has a radially enlarged portion 59 disposed to the left of the tubular housing, such portion 59 having a transverse passage 60 intersecting its hollow interior. Passage 60 may be threaded to receive the previously mentioned fluid transmission line 25.

The left end of enlarged portion 59 of tubular member 57 is closed by a body 61 which, in the present embodiment, is welded to the portion 59. As illustrated, the left end of the innermost tubular member is threaded into the body 61 and communicates with a transverse passage 62 formed in the body. The lower end of passage 62 may be threaded to receive the fluid transmission line 24. The upper end of passage 62 may be closed by a plug 63 and reciprocable within such passage is a valve member 64, similar to that disclosed in Letters Patent 2,849,263, having an internal conduit 65. Plug 63 has a hollow lower end portion 163 which loosely receives the reduced shank portion of the valve member 64 to guide the latter during its movement toward and away from its seat to insure against cocking thereof. In the position of parts shown, fluid flow may freely take place in a direction from passage 62 toward the cylinder since the valve member will be lifted from its seat; however, when fluid flows in the opposite direction, the valve member will be driven toward its seat and the fluid can then flow only through the valve member conduit 65. Valve member 64 thus acts as a one-way, speed control valve.

Formed in the outer end of body 61 is a slot 161 which closely receives the previously mentioned bar 123 for the purpose of locking the fluid distributing shaft 23 against rotation.

Outer tubular member 57 extends through the bearing housing 56 and through axially spaced ball bearings 66, 67 seated in respective housing recesses. Nuts 68 are threaded on the end of the member 57 to retain the bearing housing, the bearings and the member 57 of the fluid distributing shaft 23 in assembled relation. A seal 69 is pressed into the bearing housing 56 to the right of bearing 66 and its annular sealing lip bears against a sleeve 70 interposed between such bearing and the nuts 68 to prevent escape of fluid from the cylinder barrel about the exterior of the tubular member 57. Another seal 71 is carried by a cap member 72 to the left of bearing 67 for engagement with the tubular member 57 to supplement the seal 69. Passages 73 may be formed in the member 57 to collect fluid which may have escaped beyond the seal 69 and to pass such fluid to the fluid source by means of a suitable conduit 74.

Inner tubular member 58 extends beyond the right end of outer member 57 and into the opening 41 of the piston rod. Note that the packing 44 effects a fluid-tight seal about the exterior of the member 58. Closely fitting within the right-hand end of tubular member 57 are a plurality of radially outwardly extending projections 75 carried by the tubular member 58. Such projections bridge the annular space between the two tubular members to insure rigidity therebetween but without unduly restricting fluid flow through such annular space.

Assuming that the cylinder is assembled with the reel device as seen in FIGURE 1 with the fluid transmission lines connected with a source of fluid pressure and with the mandrel actuating rod 14 threaded into the end of the piston rod 22 or otherwise connected thereto, operation will be as follows: If fluid under pressure is passed to the cylinder through the fluid transmission line 24, fluid will flow into the passage 62 through the hollow interior of the innermost tubular member 58 to the piston rod opening 41 and through the passage 42 to the interior of the cylinder barrel at the right end of the piston 19. This will effect movement of the piston to the left since the fluid at the left end of the piston will escape through the annular space between the tubular members 57, 58 through the passage 60 and to the fluid pressure source through the fluid transmission line 25. Note that in this direction of fluid flow, valve 64 will be shifted away from its seat so as not to restrict such flow.

If fluid under pressure is admitted to the cylinder through the fluid transmission line 25, fluid will flow through passage 60 and into the cylinder barrel at the left end of the piston through the annular space between the tubular members 57, 58. This will effect movement of the piston to the right since the fluid at the right end of the piston will escape through the passage 42 into the piston rod opening 41, through the hollow interior of the innermost tubular member 58 to the passage 62 and to the fluid pressure source through the fluid transmission line 24. Note that in this direction of fluid flow, valve 64 will be shifted toward its seat thus restricting fluid flow to the valve conduit 65. This, of course, will reduce the speed of movement of the piston.

While the piston 19 is herein shown in an intermediate position, it will normally be adjacent head 20 during rotation of the reel device and of the cylinder. During such rotation, it will be understood that the cylinder barrel 18, heads 20, 21, piston 19 and piston rod 22 rotate as a unit upon the bearings 66, 67 about the axis of the fluid distributing shaft 23 which remains stationary, held by the bar 123.

The embodiment seen in FIGURE 3 is similar to that heretofore described and thus corresponding parts are identified with the same reference characters as before but with the suffix "a" added; however, the construction illustrated in FIGURE 3 is somewhat simplified thus reducing manufacturing costs.

Referring specifically to constructional differences, it will be noted that the head 21a is welded to the right-hand end of the cylinder barrel 18a instead of being removably secured in place as before. Retainer 31a is recessed into the outside face of the head 21a and is much smaller than retainer 31 since it need only retain sleeve 35a and packing 36a in place in the head.

At the left end of the cylinder barrel 18a, annular member 50 has been eliminated. Instead, tubular bearing housing 56a is welded directly to the head to provide an integral assembly therewith, it being clear that the central aperture in the head is reduced in size to closely receive the bearing housing. In this embodiment, head 20a is disposed inwardly of the ring member 49a and has a reduced diameter portion 75 which closely fits within the ring member to retain it in its barrel groove and a shoulder 76 which abuts that side of the ring member facing inwardly of the cylinder barrel. A retaining ring 77 may be drawn against the outside face of head 20a and against ring member 49a by means of capscrews 51a to removably clamp the head to the ring member to thus retain the head positioned at the end of the cylinder barrel. An O sealing ring 78 is seated in a groove in the head 20a and engages the interior of the cylinder barrel to prevent fluid leakage therebetween.

Another distinction between the construction seen in FIGURE 2 and that seen in FIGURE 3 is that in the latter, the left end of the piston rod 22a is enlarged and is provided with external threads which cooperate with internal threads formed in the piston 19a. The enlarged portion of the piston rod is grooved as before to receive a ring member 38a, the piston having an enlarged bore portion 79 which closely fits over the ring member to retain it in its groove and a shoulder which abuts the ring member. With the ring member 38a disposed in its piston rod groove, the piston will be threaded on to the piston rod to abutment with the ring member. Any suitable means may be employed to insure that the head will not come unscrewed from the rod and in the present embodiment, a small hole is drilled at the juncture of the head with the rod and a pin 80 is driven therein.

Since retainer member 39a is not employed to retain the head assembled with the piston rod but is only used to hold the sleeve member 43a and packing 44a positioned at the left-hand end of the piston rod, it may be considerably reduced in size as shown and recessed into the piston rod end.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. In a rotating, double acting fluid cylinder construction having a rotatable cylinder barrel closed by axially spaced heads, a piston within and rotatable with said barrel and reciprocable between said heads, a piston rod unitarily movable with said piston and projecting from one side thereof and outwardly of said barrel through one of said heads, the improvement comprising a stationary fluid distributing construction, including a stationary body having an opening adapted to receive fluid under pressure from a source, concentric inner and outer tubes with an annular space therebetween, both tubes having inner ends extending through an opening in the other of said heads whereby said annular space establishes communication between a fluid connection at the outer end of said outer tube and the barrel space at the opposite side of said piston, seal and bearing means between said outer tube and the opening in said other head to provide for rotational movement of said other head relative to said outer tube without fluid leakage, the outer end of said inner tube being connected to said stationary body in fluid tight manner and with its interior in communication with the opening in said body, the inner end of said inner tube slidably fitting within an axial opening in said piston and establishing communication between said body opening and the barrel space at said one piston side, and the outer terminal end of said outer tube being abutted against and held to said stationary body in fluid tight manner to seal the outer end of said annular space.

2. The construction according to claim 1 wherein said other head is ring-shaped and has a closure removably connected thereto, said closure having an axial opening through which the inner ends of both tubes extend, said stationary fluid distributing construction being assembled with said closure for connection to and removal from other head as a unit.

3. The construction according to claim 1 wherein a valve is disposed to control flow of fluid through said inner tube, said valve providing for unrestricted flow of fluid through said inner tube in a direction toward said barrel space and providing for restricted flow of fluid in the opposite direction.

4. The construction according to claim 1 wherein said stationary body has a slot in its outer surface, and a stationary member is disposed within said slot and is engageable with defining surfaces thereof to hold said body against rotation with said barrel.

5. In a rotating, double acting fluid cylinder construction having a rotatable cylinder barrel closed by axially spaced heads, a piston within and rotatable with said barrel and reciprocable between said heads, a piston rod unitarily movable with said piston and projecting from one side thereof and outwardly of said barrel through one of said heads, the improvement comprising a stationary fluid distributing construction, including a stationary body having an axial opening adapted to receive fluid under pressure from a source, concentric inner and outer tubes with an annular space therebetween, both tubes having inner ends extending through an opening in the other of said heads whereby said annular space establishes communication between a fluid connection at the outer end of said outer tube and the barrel space at the opposite side of said piston, seal and bearing means between said outer tube and the opening in said other head to provide for rotational movement of said head relative to said outer tube without fluid leakage, the outer end of said inner tube being threaded into said axial opening in said body to establish fluid connection with its interior and said source, the inner end of said inner tube slidably fitting within an axial opening in said piston and establishing communication between said axial body opening and the barrel space at said one piston side, and the outer terminal end of said outer tube being abutted against a side of said stationary body to close the outer end of said annular space, a fused connection between said body and said outer tube holding the two assembled.

6. A rotating, double acting fluid cylinder construction, comprising a rotatable cylinder barrel closed by axially spaced heads, a piston within and rotatable with said barrel and reciprocable between said heads, a piston rod unitarily movable with said piston and projecting outwardly of said barrel through one of said heads, the other of said heads being ring-shaped, a closure for said other head and removably connected thereto, said closure having an axial opening formed with axially spaced bearing seats including opposite facing annular shoulders, concentric inner and outer tubes with an annular space therebetween, both of said tubes having inner ends disposed within said closure opening, the inner tube being adapted to establish communication between a fluid source and the barrel space on one side of said piston and said annular space being adapted to establish communication between a fluid source and the barrel space on the other side of said piston, a pair of bearings between said outer tube and said closure, each having an inner race portion fitting about said outer tube and held against axial separation by spaced abutments on said outer tube, and each bearing having an outer race portion fitting within respective ones of said bearing seats, at least the outer race portion of said bearings abutting respective shoulders to hold the bearings against movement toward each other, the innermost end of said outer tube being threaded to receive a nut which constitutes the abutment at that end of the outer tube and provides for assembly and disassembly of said outer tube and bearings with said closure and also provides for adjustment of said bearings.

7. The construction according to claim 6 wherein fluid seals are disposed about said outer tube and outwardly of said bearings to respectively restrict fluid leakage from said barrel to the bearing closest to said barrel and to restrict entrance of deleterious matter from the outside to the other bearing.

8. The construction according to claim 7 wherein a lubrication opening is provided in said closure between said bearings to lubricate both bearings.

9. The construction according to claim 6 wherein said closure opening has an intermediate length of smaller diameter than its end portions to provide said bearing seats and shoulders.

References Cited in the file of this patent

UNITED STATES PATENTS

| | | |
|---|---|---|
| 577,489 | Mills | Feb. 23, 1897 |
| 2,415,181 | Johnson | Feb. 4, 1947 |
| 2,420,626 | Stevenson | May 13, 1947 |
| 2,577,858 | Sampson | Dec. 11, 1951 |
| 2,654,347 | Clark | Oct. 6, 1953 |
| 2,849,244 | Sampson | Aug. 26, 1958 |
| 2,849,263 | Johnston | Aug. 26, 1958 |

FOREIGN PATENTS

| | | |
|---|---|---|
| 889,857 | Germany | Sept. 14, 1953 |